Dec. 4, 1923.
A. W. SAEGESSER
LOCK FOR AUTOMOBILE WHEELS
Filed Aug. 4, 1919
1,476,467
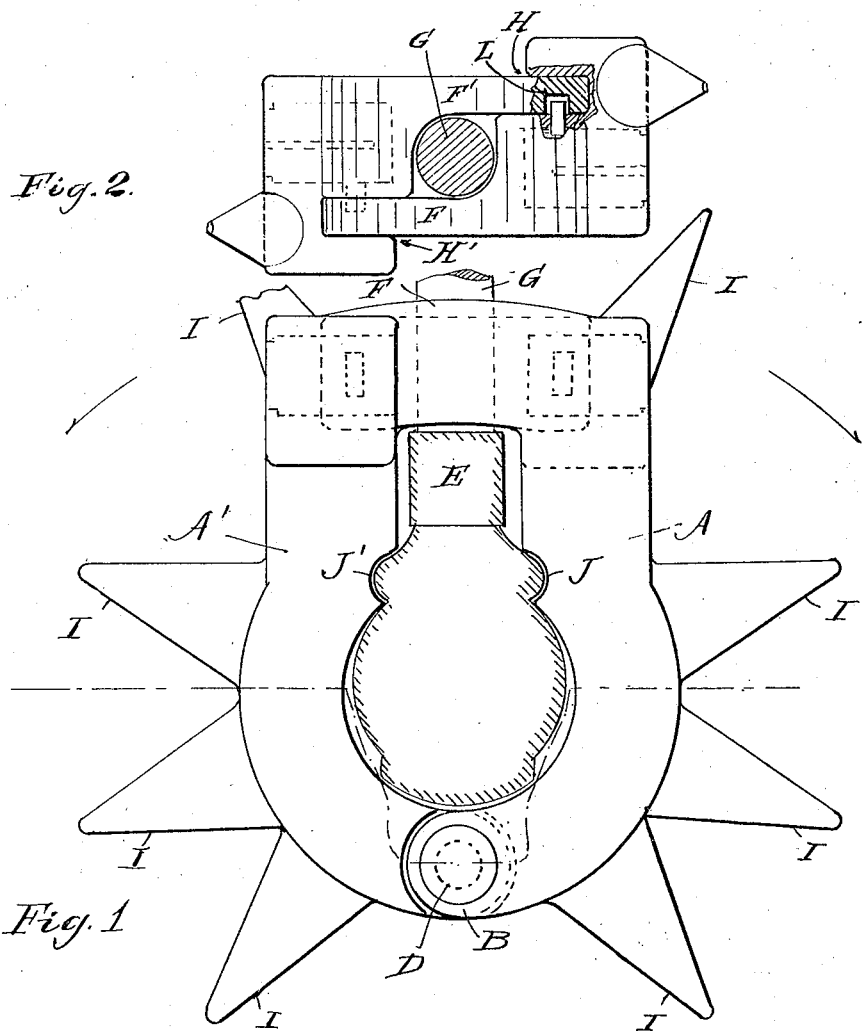
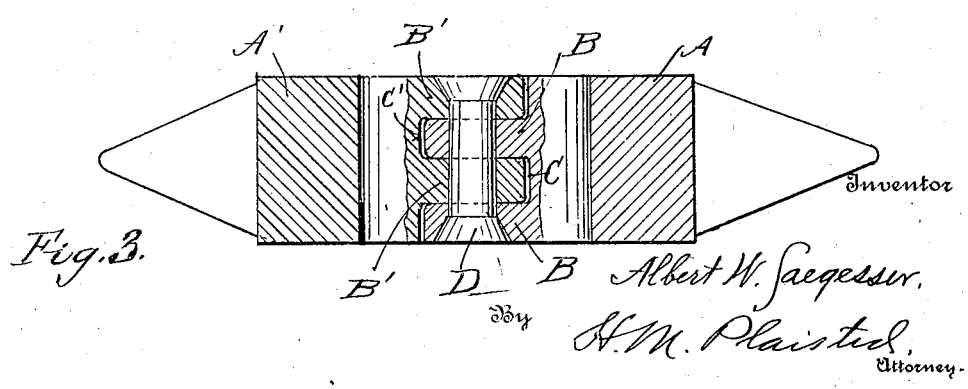

Patented Dec. 4, 1923.

1,476,467

UNITED STATES PATENT OFFICE.

ALBERT W. SAEGESSER, OF GRANITE CITY, ILLINOIS.

LOCK FOR AUTOMOBILE WHEELS.

Application filed August 4, 1919. Serial No. 315,312.

*To all whom it may concern:*

Be it known that I, ALBERT W. SAEGESSER, a citizen of the United States, residing at Granite City, in the county of Madison and State of Illinois, have invented certain new and useful Improvements in Locks for Automobile Wheels, of which the following is a specification.

This invention relates to certain new and useful improvements in locks for automobile wheels, the peculiarities of which will be hereinafter fully described and claimed.

The main object of my invention is to provide means to obstruct the turning of the wheel of an automobile and thus lock it against theft. In some localities the law requires that an automobile shall be capable of a little movement, that is that it should not be rigidly locked in its located position,—and my present improvements allow of the slight movement for adjusting the automobile required in such cases. At the same time it so obstructs the turning of the wheel that it practically prevents theft of the automobile and guards against various methods of freeing the wheel from the lock on the part of a thief.

In the accompanying drawing on which like reference letters indicate corresponding parts, Fig. 1 represents a cross section of a rim and tire casing, and part of a spoke of an automobile wheel, with my improved device applied thereto in locking position; Fig. 2 a top view of my device and cross section of the spoke engaged thereby; and Fig. 3 a sectional plan view taken on a horizontal plane through the center of a tire, of Fig. 1.

My device consists of two members,— practically symmetrical and in halves in the preferred form, whereby one pattern and casting design, or one design of forging when arranged in pairs as now to be described, will complete my locking device.

Referring to the drawing the letter A designates the body of each member of my locking device having at its outer end a double jaw formed by two lips B—B constituting an interposed slot C and provided with a hole for a pivot bolt or rivet D. The outer side of the jaw is countersunk so that said pivot bolt or rivet may be set in flush with the lip at both ends of the interlaced lips B—B and B'—B' of the double jaw when combined, as shown in Fig. 3, and make it impractical for a thief to cut off the head of the pivot. The interlaced lips are in pairs on each outer end of the members, and one lip in each pair lies practically flush with the central vertical plane across the pivot, while the other lip is located on the outside. Thus the lips when interlaced as shown in Fig. 3, will provide two lips directly adjacent to each other and to the central plane before mentioned, while the outer lips on the interlaced members will be flush with the outsides of the said members, and will be guarded by the recess in the opposite member as shown in Fig. 1 and Fig. 3. The upper end of the said member is adapted to lie close to the inner side of the wood rim E of the wheel and has a tongue F projecting across said rim close to the spoke G, and has also a groove H on the opposite side of the spoke from the tongue and on the opposite side of the wheel from the tongue F, as shown in the plan view Fig. 2. The other member of the device which in the preferred form is symmetrical, has a similar tongue F' that engages the notch H, while the second member likewise has a notch H' that engages with the said tongue F. On account of the opposite location of said tongues,—one on each side of the wheel,—and likewise the location of the said tongues on opposite sides of the spoke circumferentially the said spoke is embraced by the said tongues in their locking position shown in Fig. 2. A notch is formed in each tongue adjacent to a lock inserted in the opposite member and indicated in dotted lines in Fig. 2, which lock is in duplicate so that each tongue is locked in its opposite groove and the members are prevented from swinging outward about the pivot. The groove engages the tongue on each side of the latter and prevents prying open the interlocking engagement of tongue and groove, while the double arrangement of the same style of tongue and groove and double lock forms a complete locking engagement about the spoke and prevents insertion of a saw at either side to cut the lock.

On each member A—A' and preferably at the body portion are two or more radiating prongs I that in the complete device forms three fourths of a circle about the tire of the wheel. These radiating points project in all directions except inward towards the hub of the wheel, so that should a thief saw the spoke and endeavor to turn the device a prong would still be in position to engage the earth or roadway and practically prevent turning the wheel. The prong on each member adjacent to the hinge, is set away from the hinge a certain distance to allow space between the prongs for opening the members about the hinge pivot a sufficient distance before the prongs interfere with each other, to allow the inner ends or opposite ends from the hinge, to separate the locking ends of the members sufficiently to pass the tire of the wheel. The prongs are practically radiating in all directions in the preferred form, so that if by any means the lock can be rotated by deflating the tire, or otherwise, some of the prongs will engage the ground and guard the wheel against rotation.

In some other forms of lock a thief has been able to turn the lock after deflating the tire. To provide against this action I form on the inside of the body A a notch J opposite the metal rim K of the wheel and this notch and its corresponding notch J' in the other member will engage both sides of the rim as shown in Fig. 1 when in locking position. Therefore even though the tire be deflated the device cannot be turned, and even if it could be turned the projecting prongs are still in operative position.

This device may be drop forged, made in cast steel or other suitable material, and on account of its symmetrical construction, double connected hinge, and protected tongue, and double locking means, an effective and practically thief proof locking device for an automobile is provided.

I claim:

A device of the character described comprising two members hinged together at their outer ends and curved to embrace the rim and tire casing of a wheel, and having on the inner ends of each member a tongue projecting past the wheel spoke to the other side of the wheel, and a notch in each member on the opposite side of the spoke circumferentially, adapted to respectively interlock and embrace the wheel spoke, and locking means for each tongue, substantially as described.

In testimony whereof I have affixed my signature.

ALBERT W. SAEGESSER.